Feb. 23, 1932.                     W. FREEMAN                         1,846,388
                                  EXTENSION TRUNK
                        Filed Jan. 28, 1929      2 Sheets-Sheet 1

Inventor
Will Freeman
Bair, Freeman & Sinclair
Attorneys

Witness
Vinton Read.

Feb. 23, 1932.  W. FREEMAN  1,846,388
EXTENSION TRUNK
Filed Jan. 28, 1929    2 Sheets-Sheet 2
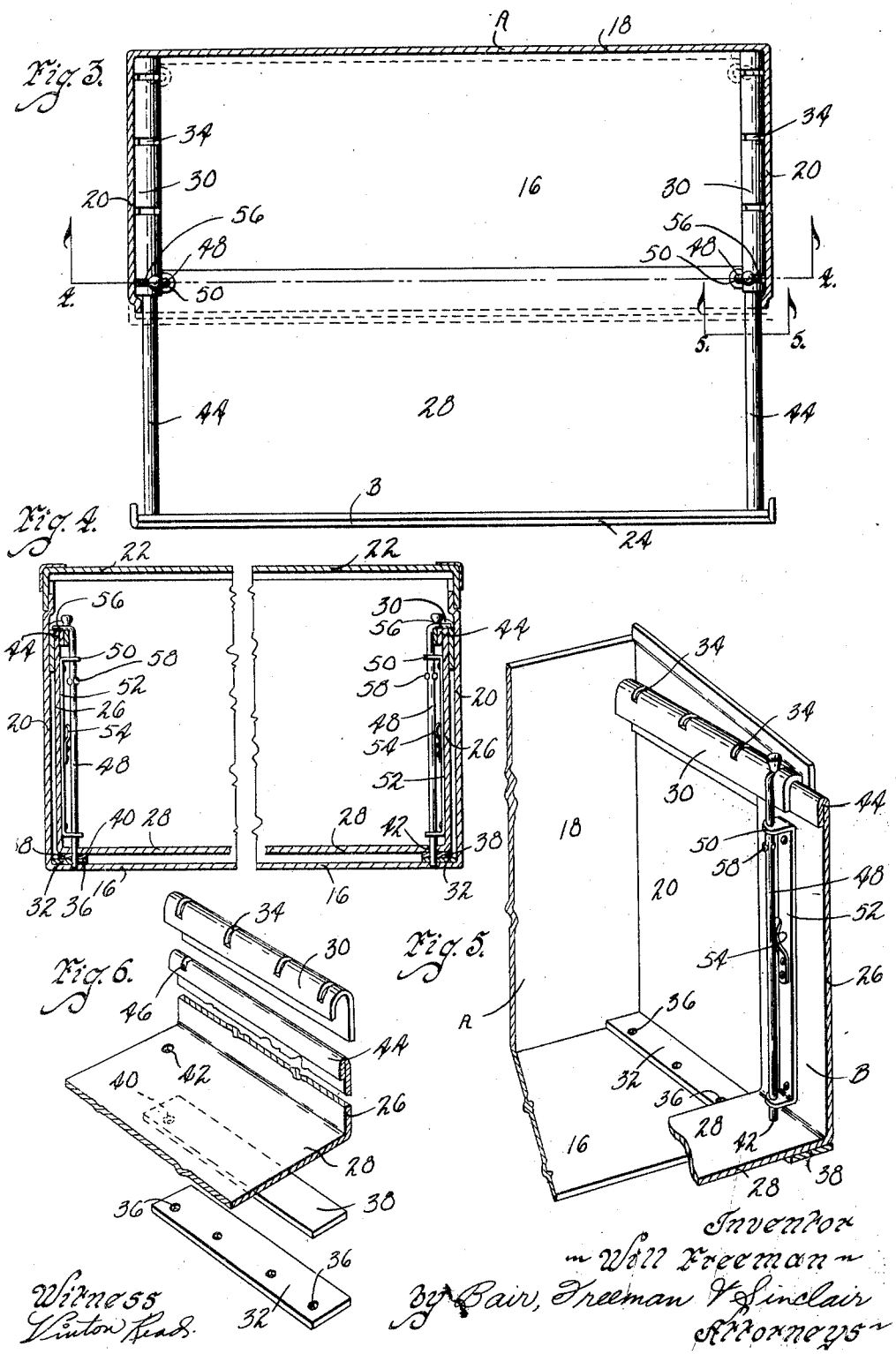
Inventor
Will Freeman
By Bair, Freeman & Sinclair
Attorneys
Witness
Vinton Read Patented Feb. 23, 1932

1,846,388

UNITED STATES PATENT OFFICE

WILL FREEMAN, OF DES MOINES, IOWA, ASSIGNOR TO MARQUETTE MANUFACTURING COMPANY, OF ST. PAUL, MINNESOTA

EXTENSION TRUNK

Application filed January 28, 1929. Serial No. 335,450.

The object of my invention is to provide an extension trunk of simple, durable and comparatively inexpensive construction.

More particularly it is my object to provide an extension trunk formed of a fixed trunk section and a movable trunk section telescopically connected with the fixed section together with means whereby the movable section may be locked relative to the fixed section in any one of a plurality of extended positions.

Still a further object is to provide a locking means carried by the movable section and adapted to coact with the fixed section near its upper edge and in its bottom at the same time whereby the movable section may be held against undesired movement and held rigidly relative to the stationary or fixed section.

Still a further object is to provide a locking bolt carried by the movable section and adapted to coact with the stationary section at two spaced points and a spring element for retaining the bolt in inoperative position.

Still another object is to so arrange the locking bolt that it serves to retain the movable section in any one of a number of extended positions and at the same time may be used to retain the movable section in closed position where the two sections form and serve as a trunk.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 3 is a sectional view taken on the line 3—3 of Figure 2.

Figure 4 is a sectional view taken on the line 4—4 of Figure 3, illustrating the locking mechanism in operative position.

Figure 5 is a detail sectional view taken on the line 5—5 of Figure 3.

Figure 6 is a perspective view of portions of the device disassembled, showing their relative positions.

Figure 1:
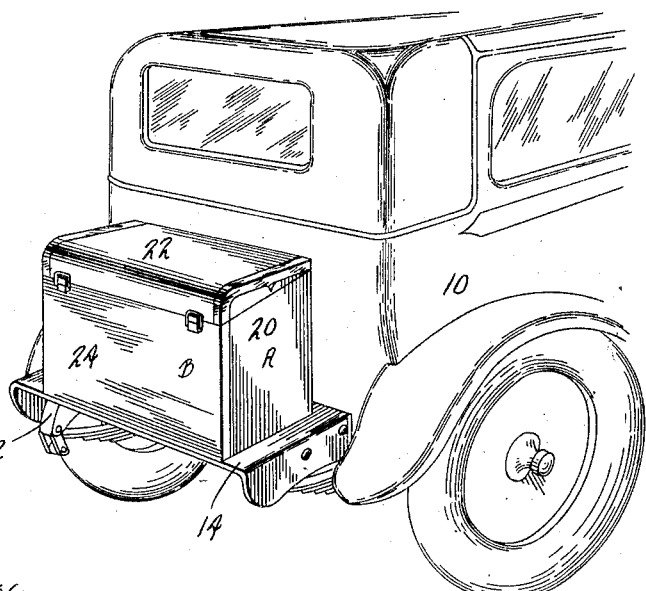
Figure 1 is a perspective view of a portion of an automobile with my extensible trunk mounted thereon.

In the accompanying drawings, I have used the reference numeral 10 to indicate generally the body of an automobile which is provided with a chassis 12. The chassis 12 ordinarily extends rearwardly beyond the body 10 and upon such extension I mount a trunk platform 14. The trunk platform 14 may be secured to the chassis 12 by any desirable method.

My extension trunk includes a fixed stationary section A and a movable section B. The section B is telescopically mounted relative to the section A. The section A includes a bottom wall 16, a rear wall 18 and a pair of end walls 20. It will be noted that the stationary section A has an open front. A hinged lid 22 is carried by and forms a part of the stationary section A.

The movable section B includes a front wall 24 adapted to normally serve as a closure for the open front of the stationary section A. The movable section B includes further, a pair of end walls 26 and a bottom 28. A pair of downwardly opening U-shaped guides 30 are mounted on the end walls 20 of the section A. A reinforcing bar or strap 32 is mounted upon the bottom 16 of the stationary section A adjacent the end walls 20.

A plurality of notches 34 are formed in the guides 30 as clearly illustrated in Figure 5 of the drawings. A plurality of openings 36 in vertical alignment with the notches 34 are formed in the strap 32.

On the underside of the bottom 28 of the movable section, is a reinforcing strap 38. The strap 38 is provided with an opening 40 coinciding with an opening 42 formed in the bottom 28. The end walls 26 have their upper edges bent over as at 44 for reinforcing the end walls and at the same time for providing a guide adapted to extend into and coact with the guides 30 mounted upon the end walls 20 of the fixed section A.

A notch 46 is formed upon the bent over edge 44 of each of the end walls 26. A locking mechanism B is carried by each of the end walls 26. The locking mechanism includes a bolt 48 slidably mounted in a pair of bearings 50 formed upon the supporting strap 52. The supporting strap 52 is riveted or otherwise secured to the end walls 26.

A spring latch 54 presses against the bolt 48 and retains it in its raised position which is its inoperative position. The bolt 48 is adapted to have its lower end extend through the opening 42 in the bottom 28 and through the opening 40 in the strap reinforcing 38.

The upper end of the bolt 48 is provided with an angular extension 56 adapted to extend into any one of the notches 34 and at the same time to extend into the notch 46 formed in the bent over portion 44. When the angular extension 56 is received within one of the notches 34 and within the notch 46, the lower end of the bolt will then project into any one of the openings 34 formed in the strap reinforcing 32.

It will be noted that the bolt 48 when raised will be free of the openings 36 and free of the notches 34 and 46 and thereafter the movable section may be moved inwardly or outwardly relative to the stationary section and may be even disconnected and removed therefrom. It will be noted further that when the bolt 48 is in its down position as shown in Figures 4 and 5 of the drawings, that the movable section is locked relative to the fixed section at two points. That is, at the upper end of the bolt 48 and at the lower end of the bolt 48.

The bolt 48 is provided with a stop 58 for limiting its upward movement relative to its bearings. When the trunk is in its completely closed position, then the bolt coacts with the innermost notch 34 and with the innermost opening 36. One of the advantages of my locking device for extensible trunks resides in the fact that the movable section is held adjacent its bottom relative to the stationary section and at the same time held at its upper end relative to the stationary section.

It will be further noted that a single bolt is used for locking the movable section relative to the fixed section at two spaced points.

One of the difficulties in extensible trunks heretofore has been the fact that the weight of commodities carried within the movable section ordinarily tend to cause the movable section to sag. With my device the bottom 28 of the movable section may be reinforced sufficiently so that when the lower end of the bolt 48 connects the movable and fixed sections together, that both sections then form a rigid device.

It will be noted further that when the movable section is in closed position, that the entire device may be used as an ordinary trunk and when in extended position the device may serve for carrying larger commodities and as a trunk luggage carrier.

Figure 7:
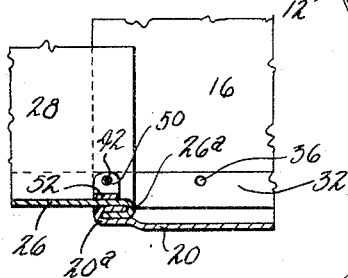
Figure 7 is a sectional view as taken on the line 7—7 of Figure 2 and showing additional parts whereby a modified form of trunk is provided.
Figure 2:
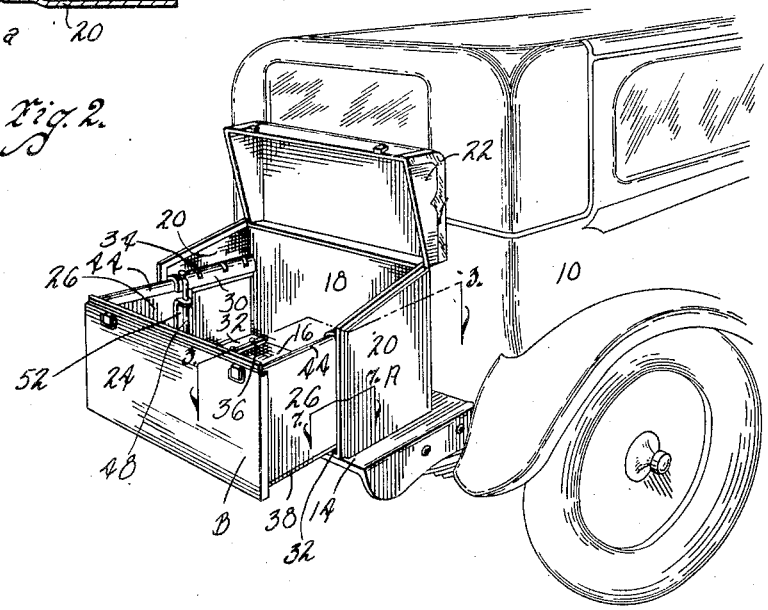
Figure 2 is a similar view illustrating the trunk in extended position.

In Figure 7 I have illustrated a modified form of structure in which a vertical channel shaped bead 26a is formed on each side wall 26 of the movable section of the trunk B. The beads 26a coact with channel shaped beads 20a formed on the side walls 20 of the stationary trunk section A. The beads 20 and 26a serve to prevent disengagement of the movable trunk section relative to the fixed trunk section and also act as a stop when the movable trunk section is pulled to its farthest extended position.

When the beads 20a and 26a are pulled tightly against each other, they automatically align the outer slots 34 and the outer openings 36 with the latch rod 48.

Some changes may be made in the construction and arrangement of the parts of my device without departing from the real spirit and purpose of my invention, and it is my intention to cover by my claims any modified forms of structure or use of mechanical equivalents, which may be reasonably included within their scope.

I claim as my invention:

1. An extensible trunk including a fixed section, a movable section telescopically associated therewith and a slidable bolt carried by the movable section adapted when in operative position to coact with the fixed section at two spaced points and yieldable means frictionally engaging the side of said bolt for thereby maintaining it in inoperative position.

2. An extensible trunk including a fixed section, a movable section telescopically associated therewith and a single means manually operable for locking the movable section through its bottom to the fixed section through its bottom and at the same time connecting the end wall of the movable section with the end wall of the fixed section to prevent sagging of the trunk when extended.

3. An extensible trunk including a fixed section, a movable section telescopically associated therewith, a single means manually operable for locking the movable section through its bottom to the fixed section through its bottom and at the same time connecting the end wall of the movable section with the end wall of the fixed section to prevent sagging of the trunk when extended and a spring to retain said single means in operative position.

Des Moines, Iowa, January 16, 1929.
WILL FREEMAN.